(12) United States Patent
Dowdy et al.

(10) Patent No.: US 12,170,674 B1
(45) Date of Patent: Dec. 17, 2024

(54) AGENTLESS REMOTE MACHINE MANAGEMENT

(71) Applicant: UNITED SERVICES AUTOMOBILE ASSOCIATION (USAA), San Antonio, TX (US)

(72) Inventors: Joshua Jesse Dowdy, Arlington, WA (US); Nathan Ryan Johnson, Celina, TX (US); Matthew James Mosher, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 198 days.

(21) Appl. No.: 17/834,593

(22) Filed: Jun. 7, 2022

Related U.S. Application Data

(60) Provisional application No. 63/208,330, filed on Jun. 8, 2021.

(51) Int. Cl.
*H04L 9/40* (2022.01)
*H04L 41/16* (2022.01)
*H04L 67/025* (2022.01)

(52) U.S. Cl.
CPC ............ *H04L 63/104* (2013.01); *H04L 41/16* (2013.01); *H04L 67/025* (2013.01)

(58) Field of Classification Search
CPC ...... H04L 41/16; H04L 63/104; H04L 67/025
USPC .......................................................... 726/3
See application file for complete search history.

(56) References Cited

U.S. PATENT DOCUMENTS

| | | | |
|---|---|---|---|
| 6,993,581 B1* | 1/2006 | Blumenau | G06F 9/5016 709/225 |
| 10,481,963 B1* | 11/2019 | Walker | H04L 1/0008 |
| 2006/0059155 A1* | 3/2006 | Illg | G06F 21/6209 707/999.009 |
| 2013/0060858 A1* | 3/2013 | Freishtat | H04L 67/535 709/204 |
| 2018/0316502 A1* | 11/2018 | Nadeau | H04L 9/0891 |
| 2019/0050049 A1* | 2/2019 | Qawami | G06N 5/04 |
| 2019/0138711 A1* | 5/2019 | Yaffe | G06F 16/2379 |
| 2019/0188114 A1* | 6/2019 | Hopper | G06F 11/3414 |
| 2021/0073105 A1* | 3/2021 | Shah | G16H 40/67 |
| 2022/0109723 A1* | 4/2022 | Mamadapur | H04L 67/1089 |
| 2022/0164327 A1* | 5/2022 | Zhu | G06F 16/217 |
| 2023/0319656 A1* | 10/2023 | Jung | H04W 48/08 |

* cited by examiner

*Primary Examiner* — David P Zarka
(74) *Attorney, Agent, or Firm* — Fletcher Yoder, P.C.

(57) ABSTRACT

Systems and techniques are provided herein to an agentless Information Technology (IT) asset management system that automatically identifies and executes remedial actions independent of a client-side agent installed on the client system. In particular, artificial intelligence is used to trigger agentless actions via one or more application programming interfaces (APIs). The APIs trigger services that interface directly with operating system supported functionalities to manage IT assets.

18 Claims, 3 Drawing Sheets

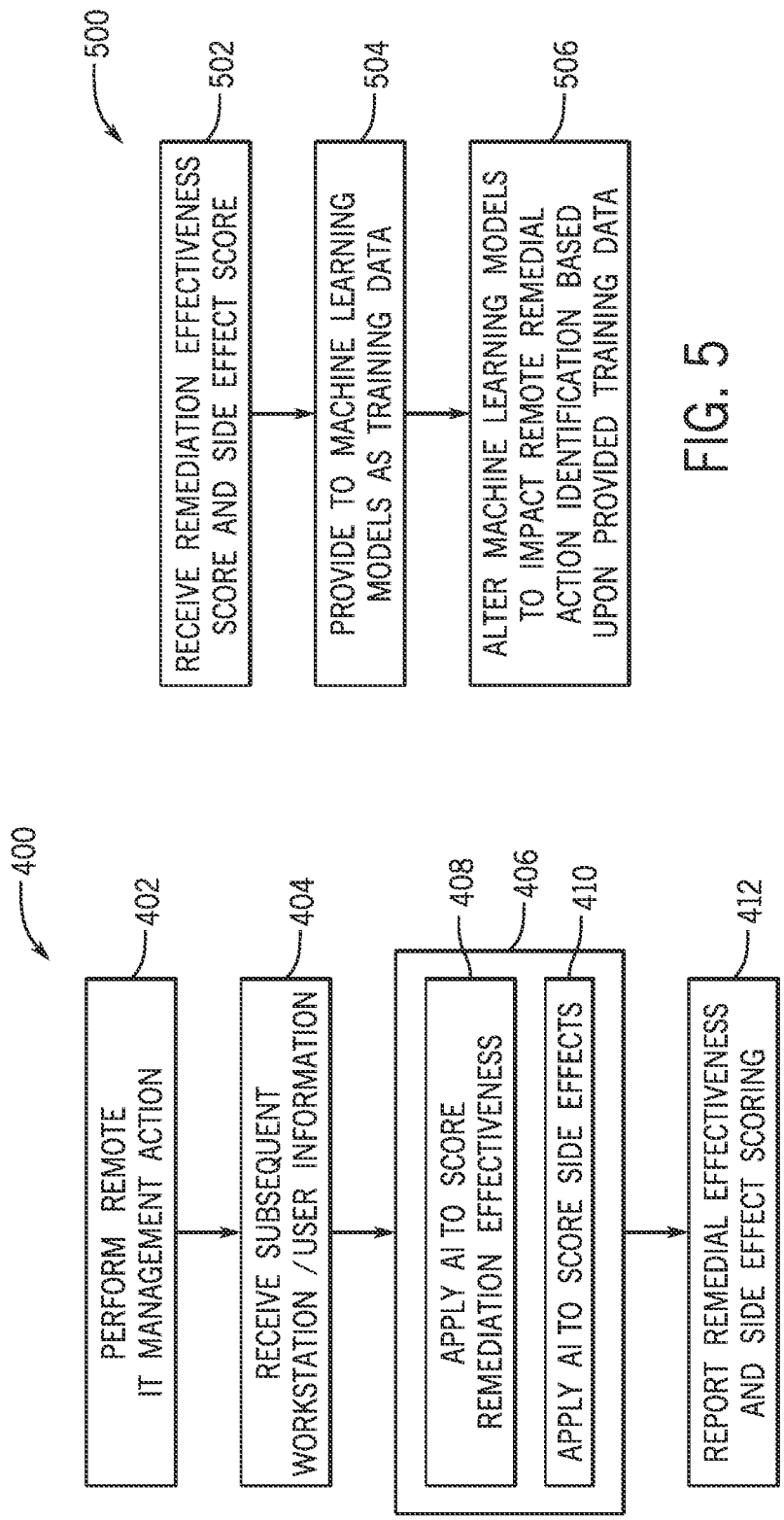

AGENTLESS REMOTE MACHINE MANAGEMENT

CROSS-REFERENCE TO RELATED APPLICATION

This application claims priority to and the benefit of U.S. Provisional Application No. 63/208,330 entitled "Agentless Remote Machine Management," filed Jun. 8, 2021, which is hereby incorporated by reference in its entirety for all purposes.

BACKGROUND

The present disclosure relates generally to methods and systems to facilitate agentless management of information technology (IT) assets. In particular, artificial intelligence is used to trigger agentless actions via one or more application programming interfaces (APIs). The APIs trigger services that interface directly with operating system supported functionalities to manage IT assets.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

As IT environments exponentially grow, it has become increasingly difficult to provide manual troubleshooting and management of IT assets. Further, oftentimes solutions performed via manual interactions may be lost, as the management oftentimes relies on a vast number of IT professionals which may or may not communicate solutions to one another. Additionally, in many scenarios manual management may result in an incomplete solution, as it may be difficult for IT professionals to troubleshoot items, causing delays in maintenance and repair of these IT assets. Typically, remote IT management has required an agent with administrator access to be installed on the managed asset. This can be quite cumbersome and create security risks, as each managed asset include may require installation of software that has administrative privileges to the asset, regardless of whether the tasks that will be implemented by the client will actually require such privileges.

It is now recognized that systems and methods for automating IT asset management may greatly improve speed and accuracy of IT management actions.

SUMMARY

Systems and methods are provided for identifying and triggering agentless IT management actions via an asset's operating system are provided. The system includes an artificial intelligence system that may identify IT asset changes to be made, agentless IT asset management actions to trigger, and the effectiveness of performed agentless IT asset management actions. One or more service APIs may receive a command instructing services to perform the agentless remote IT asset action. The service APIs may determine access rights necessary to perform the agentless remote IT asset action and invoke the agentless remote IT asset action when the requestor has the proper access rights. When the requestor does not have the proper access rights, the APIs may refrain from triggering the agentless remote IT asset action.

DRAWINGS

These and other features, aspects, and advantages of the present disclosure will become better understood when the following detailed description is read with reference to the accompanying drawings in which like characters represent like parts throughout the drawings, wherein:

FIG. 4 is a flowchart illustrating a process for measuring an effectiveness of implemented agentless remote IT management actions, in accordance with an embodiment of the current disclosure; and FIG. 5 is a flowchart, illustrating a process for altering subsequent identification of agentless remote IT management actions, in accordance with an embodiment of the current disclosure.

DETAILED DESCRIPTION

One or more specific embodiments of the present disclosure are described below. In an effort to provide a concise description of these embodiments, certain features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward systems and methods for agentless remote IT management actions. Artificial Intelligence engines may identify remote agentless IT management actions to implement on a remote IT asset. IT management services may implement these actions to affect changes in the IT system (e.g., at specific IT assets). The techniques provided herein, from end to end, are automated, repeatable, and scalable, removing human error related to manual intervention with the machines to fix them for users.

Figure 1:
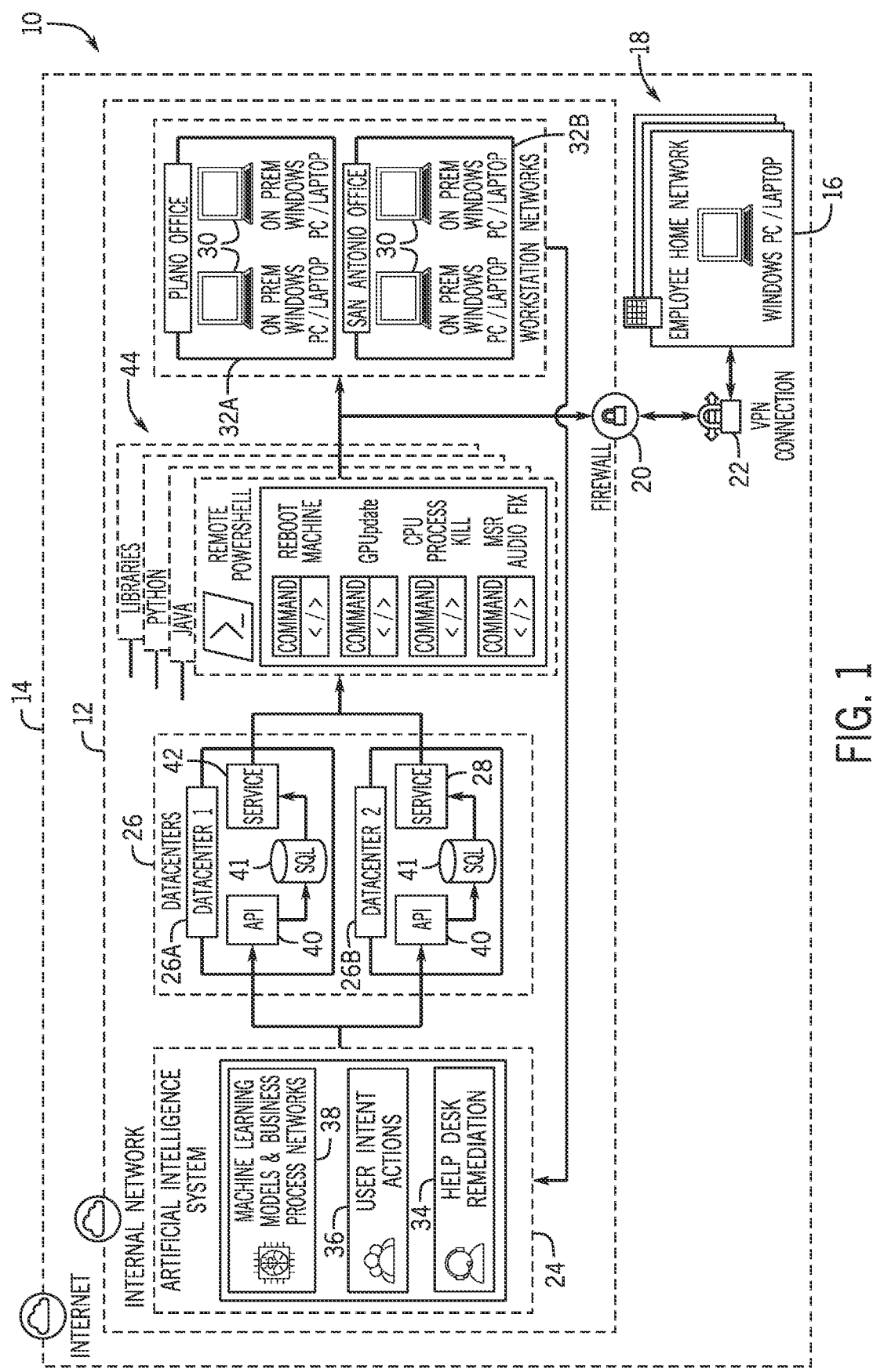
FIG. 1 is an illustration of a system 10 for agentless remote IT management (an "agentless remote asset management system"), in accordance with an embodiment of the current disclosure.

FIG. 1 is an illustration of a system 10 for agentless remote IT management, in accordance with an embodiment of the current disclosure. In some embodiments, some portions of the system 10 may be on an internal network 12, while other portions of the system 10 may be on an external network 14. For example, the system 10 may include IT assets 16 (e.g., computers) on home networks 18 which may connect to the internal network 12 through the firewall 20 via a virtual private network (VPN) connection 22.

In the internal network 12, the system 10 includes an artificial intelligence system 24, data centers 26, and a remote Windows® process 28 that when used in combination may manage internal IT assets 30 (e.g., across offices 32A and 32B) and/or external assets 16.

The artificial intelligence system 24 may use help desk remediation inputs 34, user intent actions 36 and/or machine learning models & business process networks 38 to identify agentless remote IT management actions to undertake. The help desk remediation inputs 34 may include inputs into help desk software from a help desk representative. In one embodiment, this may include help desk "tickets" generated based upon discussions between a user and help desk representatives. For example, this might be a ticket that indicates an asset associated with user is underperforming based upon the user interacting with a help desk representative and the help desk representative inputting a ticket into the help desk software. By identifying asset management issues, remedial agentless remote IT management actions may be identified.

The user intent actions 36 may include data that is indicative of user intent. For example, a user's search query of "computer running slow" may indicate that an asset associated with the user is under performing. By identifying asset management issues, remedial agentless remote IT management actions may be identified.

The machine learning models and business process networks 38 may identify data patterns and/or trends to identify certain features of IT assets. For example, an event log (e.g., event viewer) data may include performance patterns that indicate particular agentless remote IT management actions to undertake on particular IT assets.

Upon the artificial intelligence system 24 identifying an agentless remote IT management action, one or more commands may be transferred to a central application stack in one or more datacenters 26 that can remotely manage any machine in the same domain anywhere in the world and execute any business process needed to manage IT assets 16 and/or 30 (e.g., computers/machines) on the internal network 12 without a software packaged agent that has to be installed on every Windows® endpoint. As illustrated, the data centers 26 may include multiple data centers (e.g., 26A and 26B), which may load balance an API 40, which accepts one or more agentless remote IT management actions in the form of console commands, PowerShell® commands, PowerShell® scripts, batch scripts, or any language, script or command possible to executed within an operating system (e.g., Windows®) process.

In some embodiments, a clear audit trail of a requestor who triggered execution of particular commands on particular IT assets 16 and/or 30 (e.g., computers/machines) may be logged and submitted to an elastic stack for monitoring, alerting, and long term storage. To do this in a secure manner that ensure logging prior to execution, in some embodiments, each command type is added to a SQL database 41 as a unique request type, and consumed by a load balanced service 42 within an operating system (e.g., Windows®) server environment. The service 42 looks at the SQL database 41and executes a command type on a list of machines submitted via the API 40.

The service 42 then executes processes to implement the agentless remote IT management actions and, thus, may be referred to herein as an "electronic process execution service." In some embodiments, the service 42 starts an admin process on the server and invokes a remote Web Services for Management (WSMAN) process 44 that, much like the Windows® Management Instrumentation (WMI) method Win32_Process Create ( ) which can be run locally or remotely over RPC. The service 42 runs asynchronously, resulting in sub minute execution on thousands of IT assets (e.g., 32A, 32B, 16) concurrently. As illustrated, the process 44 may include any language script or command that can executed within a Windows® process. In the example embodiment, a remote PowerShell® includes command 46 to reboot a computer, command 48 to perform a group policy update (GPUpdate—which refreshes a computer's local Group Policy and any Active Directory-based group policies), command 50 to perform a CPUProcessKill, which kills a specified process from execution by the central processing unit (CPU), and a command 52 to perform a Member Service Representative (MSR) Audio Fix, which performs a custom script requested by a member services representative to fix a common audio issue at an IT asset.

Figure 2:
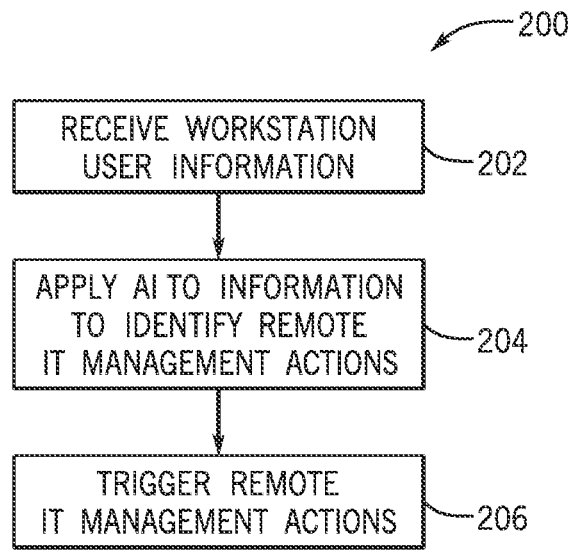
FIG. 2 is a flow chart, illustrating a process for identifying and requesting agentless remote IT management actions, in accordance with an embodiment of the current disclosure.

FIG. 2 is a flow chart, illustrating a process 200 for identifying and requesting agentless remote IT management actions, in accordance with an embodiment of the current disclosure. The process 200 begins with receiving IT asset (e.g., computer/workstation) and/or user information (block 202). For example, network monitoring agents may periodically poll for performance and/or event data from IT assets, such as assets 16 and/or 30 of FIG. 1. This data may include but is not limited to performance metrics (e.g., CPU, memory, and/or storage utilization), tracked by an operating system's performance monitor, security and other events tracked by the operating system's event viewer/logs, etc. Further, this data may include, for example, contextual user intent discerned by the artificial intelligence system 24 of FIG. 1 and/or help desk information received by the artificial intelligence system 24 of FIG. 1.

The process 200 applies artificial intelligence to the received information to identify agentless remote IT management actions to implement (block 204). For example, as mentioned above, some agentless remote IT management action identification processes (e.g., identifying particular agentless remote IT management actions to implement from a set of known available agentless remote IT management actions) described herein may be performed by the machine learning models & business process networks 38 using the information (e.g., information associated with the IT assets and/or user information) and historical network data that includes similar information and an indication of effects of implementing particular ones of the agentless remote IT management actions. The machine learning models & business process networks 38 (e.g., circuitry used to implement machine learning algorithms or logic) may access this data to identify patterns, correlations, or trends associated with remediation of IT issues. This data may be sourced from a multitude of diverse systems, online services, and databases, allowing new data patterns not previously attainable without machine learning to emerge. As used herein, machine learning may refer to algorithms and statistical models that computer systems use to perform a specific task with or without using explicit instructions. For example, a machine learning process may generate a mathematical model based on a sample of the clean data, known as "training data," in order to make predictions or decisions without being explicitly programmed to perform the task.

Depending on the inferences to be made, the machine learning models & business process networks 38 may implement different forms of machine learning. In some embodiments, a supervised machine learning may be implemented. In supervised machine learning, the mathematical model of a set of transaction data contains both the inputs and the desired outputs. The set of transaction data is referred to as "training data" and is essentially a set of training examples. Each training example has one or more inputs and the desired output, also known as a supervisory signal. In a mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how similar or related two objects (e.g. two behaviors from different users) are. It has applications in fraud detection, ranking, recommendation systems, visual identity tracking, face verification, and speaker verification.

Additionally and/or alternatively, in some situations, it may be beneficial for the machine learning models & business process networks 38 to utilize unsupervised learning (e.g., when particular output types are not known). Unsupervised learning algorithms take a set of transaction data that contains only inputs, and find structure in the data, like grouping or clustering of transaction data. The algorithms, therefore, learn from test data that has not been labeled, classified or categorized. Instead of responding to feedback, unsupervised learning algorithms identify commonalities in the transaction data and react based on the presence or absence of such commonalities in each new piece of transaction data.

Cluster analysis is the assignment of a set of observations (e.g., transaction datasets) into subsets (called clusters) so that observations within the same cluster are similar according to one or more predesignated criteria, while observations drawn from different clusters are dissimilar. Different clustering techniques make different assumptions on the structure of the transaction data, often defined by some similarity metric and evaluated, for example, by internal compactness, or the similarity between users of the same cluster, and separation, the difference between clusters. Predictions or correlations may be derived by the machine learning circuitry 26. For example, groupings and/or other classifications of the transaction data may be used to predict agentless remote IT management actions to implement to modify particular patterns seen in inputted data (e.g., performance data and/or event data associated with one or more particular IT assets). The identification of particular agentless remote IT management actions may result in triggering the particular agentless remote IT management actions (e.g., via a command sent to an API that results in triggering an operating system process including the command via one or more server-side processes (block 206).

As mentioned above, in some embodiments, to trigger the operating system process, an API may accept one or more (1:M) commands (e.g., console commands, PowerShell® commands, PowerShell® scripts, batch scripts, or other code, script, or command that can execute within a Windows® process). Each command type of the received commands may be added to an SQL database as a unique request type sourced from a particular requestor. These unique request types may be consumed by a service within an operating system (e.g., Windows®) server environment. The service may periodically poll the SQL database and execute any identified command types in the SQL database on a list of machines submitted via the API. Specifically, the service may start an admin process (e.g., a process with administrator privileges) on the server-side and invoke remote a remote process (e.g., in Windows®, a WSMAN process), which can be run locally at the managed IT asset or remotely from the server over a remote procedure call (RPC). The service may run asynchronously, resulting in sub-minute execution on thousands of managed IT assets (e.g., computers/machines) concurrently.

Thus, the process 200 may result in an automated system that may take, as input, information regarding particular IT assets and/or user information, identify particular agentless remote IT management actions to implement to improve functionality of an IT environment (e.g., enhance performance and/or security of the IT environment) and trigger execution of a process remote to the IT assets being managed, resulting in affecting a change in the IT environment. In this manner, IT management can be implemented remote from the IT asset being managed without a need of an agent installed at the managed IT asset. This may provide added efficiency and security to the IT environment, by requiring fewer points of added software and security access.

In some embodiments, access to execute each command type is granularly controlled. Security may be simplified via centralized management and execution of commands. Indeed, in some embodiments, access to execute each command type is protected with security groups. This granular approach ensure that any commands can be enabled or disabled at any time, which is vastly simplified by the agentless design. For example, in some embodiments, InfoSec alerts may indicate that certain commands should be disabled in order to stay secure.

Figure 3:
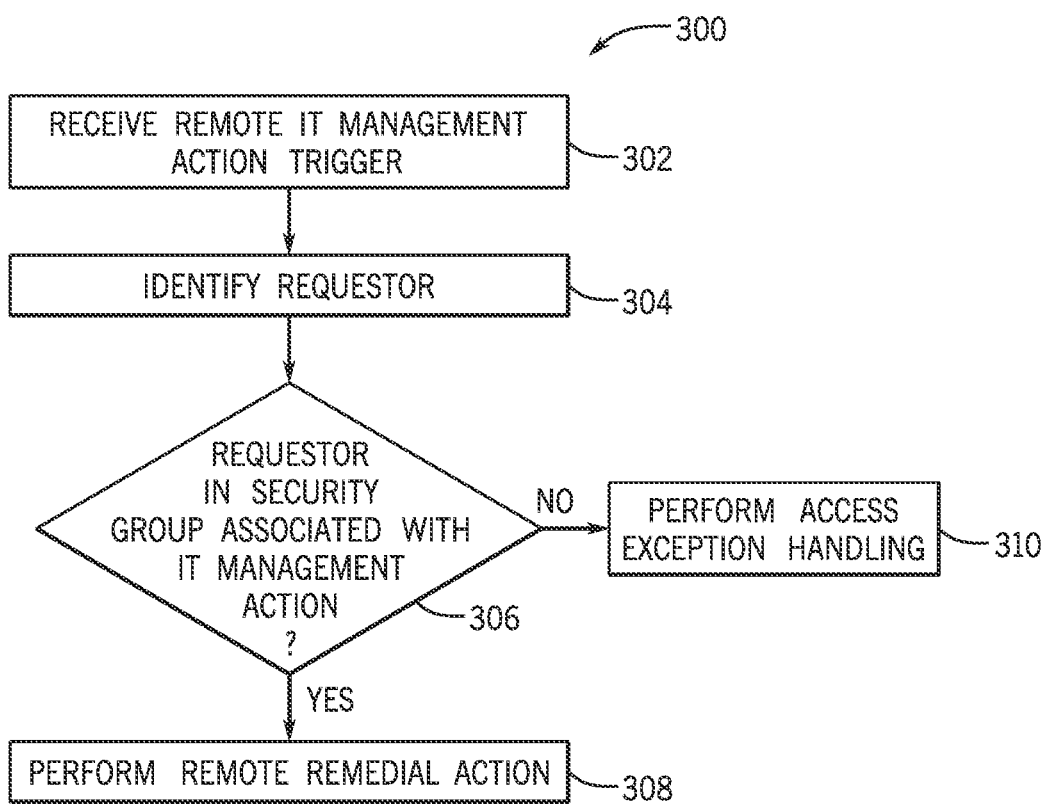
FIG. 3 is a flow chart, illustrating a process for authenticating access right prior to triggering agentless remote IT management actions, in accordance with an embodiment of the current disclosure.

FIG. 3 is a flow chart, illustrating a process 300 for authenticating access right prior to triggering agentless remote IT management actions, in accordance with an embodiment of the current disclosure. The process 300 begins by receiving the agentless remote IT management action trigger (block 302). As mentioned above, the trigger may be received in the form of one or more commands provided to an API that results in unique command types being added to an SQL database.

Along with the provision of the command to the API, the API may also receive an indication of the requestor, which is used to identify the requestor (block 304). For example, a user identifier of the requestor, a media access control (MAC) address of a requesting computer, an Internet Protocol (IP) address of the requesting computer, or other identifier may be used to identify the requestor.

An administrator of the agentless remote IT management action system may set security/access rights for each action type. In this manner, different requestors that have access to the API may have different access rights to perform different sets of agentless remote IT management actions. Further, access rights may be dynamically altered based upon external factors. For example, information security (InfoSec) reports may indicate particular commands that should be avoided (e.g., installation of software with a realized vulnerability). The access rights for such commands may be altered to indicate very limited or no access rights for any requestors to such commands, effectively disabling the command. In alternative embodiments, an enable/disable flag may be used as an alternative, enabling previous access rights to the command to be retained and still affording the ability to disable the command.

At decision block 306, a determination is made as to whether the identified requestor has access rights and/or is in a security group associated with the particular one or more agentless remote IT management actions requested via the API.

If the requestor has access rights and/or is in a security group associated with the particular one or more agentless remote IT management actions requested via the API, the API may trigger the process execution by the remote services (block 308). For example, as explained above, the command may be added to the SQL database where it is picked up by the services and may execute an admin process including the command, ultimately affecting change on one or more remote IT assets (e.g., specified by the artificial intelligence system in or with the command).

When the requestor does not have access rights and/or is not in a security group associated with at least one of the particular one or more agentless remote IT management actions requested via the API, the API may refrain from triggering the process execution by the remote services, instead performing an access exception handling process (block 310). For example, in some embodiments, the API may trigger process execution for any of the particular one or more agentless remote IT management actions that the requestor has access rights for and/or is in an associated security group, while refraining from triggering process execution for the other particular one or more agentless remote IT management actions.

In an alternative embodiment, to avoid unintended consequences, the API may take an all or nothing approach to triggering process execution. Specifically, the API may refrain from triggering process execution for any of the particular one or more agentless remote IT management actions when the requestor does not have access rights for and/or is not in an associated security group.

In some embodiments, a graphical user interface may provide an indication to the requestor that requestor does not have access rights and/or is not in a security group associated with one or more agentless remote IT management actions. The requestor may be provided one or more prompts to provide access rights credentials and/or chose whether or not to trigger execution of particular ones of the agentless remote IT management actions that the requestor has access rights to or that are associated with a security group the requestor is in. The API may prompt the requestor whether to decline triggering execution of particular ones of the agentless remote IT management actions that the requestor has access rights to or that are associated with a security group the requestor is in. In either case, the API may refrain from triggering execution of agentless remote IT management actions that the requestor does not have access rights to and/or that are not associated with a security group the requestor is in.

As mentioned above, in some embodiments, the artificial intelligence system 24 may measure an effectiveness of implemented agentless remote IT management actions. FIG. 4 is a flowchart illustrating a process 400 for measuring an effectiveness of implemented agentless remote IT management actions, in accordance with an embodiment of the current disclosure.

The process 400 begins with performing the agentless remote IT management action (block 402). For example, as mentioned above, the command may be picked up from the SQL database, resulting in execution of an admin process including the command, ultimately affecting change on one or more remote IT assets (e.g., specified by the artificial intelligence system in or with the command).

The process 400 subsequently receives IT asset (e.g., computer/workstation) and/or user information (block 404). For example, the subsequently received IT asset and/or user information may include performance, security, and or other relevant data that may indicate whether the executed agentless remote IT management actions had a positive change on one or more managed IT assets. Further the subsequently received IT asset and/or user information may include performance, security, and or other relevant data that may indicate whether any other managed IT assets have had a negative change since execution of the agentless remote IT management actions.

The process 400 continues by scoring the executed agentless remote IT management actions (block 406). Specifically, artificial intelligence may be used to determine a remediation effectiveness (block 408) and any side effects (block 410). The remediation effectiveness may be ascertained by comparing pre-execution data with post execution data specific to the managed IT assets that the agentless remote IT management action was executed for. When the trend in the comparison moves in a positive/desired direction from pre-execution to post-execution, the agentless remote IT management action may be deemed effective. An effectiveness score may be generated based upon the magnitude of the trend in the positive direction. Further, if the trend stays flat or moves in a negative/undesired direction from pre-execution to post-execution, the agentless remote IT management action may be deemed as ineffective. The side effects may be discerned by noticing any positive or negative trends in the comparison of pre-execution data with post execution data to other IT assets. A side effect scoring may be calculated based upon a magnitude of the positive and/or negative trends along with a number of and/or relative importance of the impacted IT assets.

It is important to note that only a subset of available data may be used in scoring of effectiveness and/or side effects. The subset of data used in the comparisons may be selected by the artificial intelligence system based upon a machine learning based ascertainment of data likely impacted by the executed agentless remote IT management actions, as gleaned from prior training data (e.g., illustrating patterns of the subsets being impacted by the particular executed agentless remote IT management actions).

Once generated, the remedial effectiveness and/or side effect scorings may be reported (block 412). For example, an electronic indication (e.g., data packet(s)) indicating the scoring may be provided to downstream electronic devices for further control/processing and/or a graphical user interface may display the generated remediation effectiveness and/or side effects scorings.

The machine learning models for identifying agentless remote IT management actions may change based upon the effectiveness and any side effects identified. FIG. 5 is a flowchart, illustrating a process 500 for altering subsequent identification of agentless remote IT management actions, in accordance with an embodiment of the current disclosure.

The process 500 includes receiving remediation effectiveness and side effect scores (block 502). For example, data packets indicative of these scores may be generated as mentioned in the discussion of block 412 of FIG. 4.

These scores and their associated agentless remote IT management actions may be sent to the machine learning models & business process networks 38 for updating the models. For example, these scores and their associated agentless remote IT management actions may be inputted into the models as subsequent training data (block 504), altering subsequent output of the models (block 506). In some embodiments, the subsequent training data may include the remediation triggering data that caused the execution of the action to be triggered. Thus, for highly effective actions with few side effects, the models may be updated to more-readily identify this type of action when similar remediation triggering events occur. For relatively less-effective actions, the models may be updated to be less likely to identify this type of action when similar remediation triggering events occur. The side effect scoring may also be used to weight the likelihood of identifying the actions as a remedial measure. For example, depending on the severity of the side effects and whether the side effects are positive or negative, the models may update to be more or less likely to identify the executed actions in subsequent similar scenarios.

The technical effects of the systems and methods described herein include automatic remedial action identification using artificial intelligence. Moreover, the current system and methods implement such remedial actions using an agentless remote IT management action, creating an efficient and cost-effective solution for implementing remedial measures in an IT environment. The current embodiments include a central application stack in one or more datacenters that can remotely manage any machine in the same domain anywhere in the world and execute any business process needed to manage machines on the network without a software packaged agent that has to be installed on every Windows® endpoint. End to end techniques are automated, repeatable, and scalable, removing human error related to manual intervention with the machines to fix them for users. Security is simplified via centralized management and execution of commands. A clear audit trail of who executed what command on what machines is logged and submitted to the Elastic stack for monitoring, alerting, and long term storage. Access to execute each command type is protected with security groups. This granular approach ensure that any commands can be enabled or disabled at any time, which is vastly simplified by the agentless design. For example, in some embodiments, InfoSec alerts may indicate that certain commands should be disabled in order to stay secure.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An agentless remote asset management system, comprising:
   an artificial intelligence system;
   a data center serving an application programming interface (API) to an electronic process execution service;
   the electronic process execution service; and
   one or more electronic assets;
   wherein in the artificial intelligence system is configured to:
     receive electronic data related to the one or more electronic assets;
     apply artificial intelligence to the electronic data to identify an agentless remote IT management action of a set of available agentless remote IT management actions predicted to affect a desired change to at least one of the one or more electronic assets; and
     request, by sending a request to the API, that the electronic process execution service execute the agentless remote IT management action; and
   wherein the electronic process execution service is configured to, in response to the request, execute the agentless remote IT management action, by generating, remote to the one or more electronic assets, an operating system process that includes the agentless remote IT management action in the form of a command that may be implemented by an operating system of the one or more electronic assets, independent of a non-operating system software agent installed at the one or more electronic assets, wherein the command comprises a console command, a shell command, a shell script, a batch script, or any combination thereof.

2. The agentless remote asset management system of claim 1, wherein the agentless remote asset management system is configured to:
   identify a requestor of the request;
   determine whether the requestor has access privileges to cause execution of the agentless remote IT management action; and
   execute, via the electronic process execution service, the agentless remote IT management action when the requestor has the access privileges, while refraining from executing the agentless remote IT management action when the requestor does not have the access privileges.

3. The agentless remote asset management system of claim 2, wherein the agentless remote asset management system is configured to:
   determine whether the requestor has the access privileges based upon whether the requestor is in a security group that is associated with the agentless remote IT management action.

4. The agentless remote asset management system of claim 1, wherein the agentless remote asset management system is configured to:
   identify that the agentless remote IT management action is listed in an information security notification; and
   based upon identifying that the agentless remote IT management action is in the information security notification, disable subsequent execution of the agentless remote IT management action.

5. The agentless remote asset management system of claim 1, wherein the agentless remote asset management system is configured to:
   maintain an audit trail of a requestor of the agentless IT remote management action that caused execution of the agentless IT remote management action on particular ones of the one or more electronic assets.

6. The agentless remote asset management system of claim 5, wherein the agentless remote asset management system is configured to:
   maintain the audit trail by:
     upon receiving the request at the API, and prior to execution of the agentless IT remote management action, providing an indication of the request in a database.

7. The agentless remote asset management system of claim 6, wherein the electronic process execution service is configured to:
   poll the database to identify any indications of agentless IT remote management actions stored in the database; and trigger the execution of the agentless remote IT management action based upon identifying, via the poll, that the indication of the request is in the database.

8. The agentless remote asset management system of claim 1, wherein the agentless remote asset management system is configured to:
after the execution of the agentless remote IT management action, score an effectiveness of the agentless remote IT management action by comparing a portion of subsequent electronic data related to a particular asset of the one or more electronic assets that the agentless remote IT management action was intended affect with a portion of the electronic data related to the particular asset of the one or more electronic assets to identify a trend direction in the comparison.

9. The agentless remote asset management system of claim 8, wherein the agentless remote asset management system is configured to:
score side effects of the agentless remote IT management action by comparing a portion of the subsequent electronic data related to the one or more electronic assets other than the particular asset with a portion the electronic data related to the one or more electronic assets other than the particular asset to identify a trend direction in the comparison.

10. The agentless remote asset management system of claim 9, wherein the agentless remote asset management system is configured to:
alter a machine learning model used to identify the agentless remote IT management action based upon the scoring of the effectiveness and scoring of the side effects.

11. A computer-implemented method, comprising:
receive electronic data related to one or more electronic assets;
apply artificial intelligence to the electronic data to identify an agentless remote IT management action of a set of available agentless remote IT management actions that is predicted to affect a desired change to at least one of one or more electronic assets; and
request, by sending a request to an application programming interface (API) of an electronic process execution service, that the electronic process execution service execute the agentless remote IT management action; and
in response to the request, execute the agentless remote IT management action, by generating, remote to the one or more electronic assets, an operating system process that includes the agentless remote IT management action in the form of a command that may be implemented by an operating system of the one or more electronic assets, independent of a non-operating system software agent installed at the one or more electronic assets, wherein the command comprises a console command, a shell command, a shell script, a batch script, or any combination thereof.

12. The computer-implemented method of claim 11, comprising:
identifying a requestor of the request;
determining whether the requestor has access privileges to cause execution of the agentless remote IT management action; and
executing, via the electronic process execution service, the agentless remote IT management action when the requestor has the access privileges, while refraining from executing the agentless remote IT management action when the requestor does not have the access privileges.

13. The computer-implemented method of claim 12, comprising:
determining whether the requestor has the access privileges based upon whether the requestor is in a security group that is associated with the agentless remote IT management action.

14. The computer-implemented method of claim 11, comprising:
maintaining an audit trail of a requestor of the agentless IT remote management action that caused execution of the agentless IT remote management action on particular ones of the one or more electronic assets, by:
upon receiving the request at the API, and prior to execution of the agentless IT remote management action, providing an indication of the request in a database;
polling the database to identify any indications of agentless IT remote management actions stored in the database; and
triggering the execution of the agentless remote IT management action based upon identifying, via the poll, that the indication of the request is in the database.

15. The computer-implemented method of claim 11, comprising:
after the execution of the agentless remote IT management action, scoring an effectiveness of the agentless remote IT management action by comparing a portion of subsequent electronic data related to a particular asset of the one or more electronic assets that the agentless remote IT management action was intended affect with a portion of the electronic data related to the particular asset of the one or more electronic assets to identify a trend direction in the comparison;
scoring side effects of the agentless remote IT management action by comparing a portion of the subsequent electronic data related to the one or more electronic assets other than the particular asset with a portion the electronic data related to the one or more electronic assets other than the particular asset to identify a trend direction in the comparison; and
altering a machine learning model used to identify the agentless remote IT management action based upon the scoring of the effectiveness and scoring of the side effects.

16. One or more tangible, non-transitory, computer-readable mediums, comprising computer-readable instructions that, when executed by one or more processors of one or more computers, cause the one or more computers to:
receive electronic data related to one or more electronic assets;
apply artificial intelligence to the electronic data to identify an agentless remote IT management action of a set of available agentless remote IT management actions that is predicted to affect a desired change to at least one of one or more electronic assets; and
request, by sending a request to an application programming interface (API) of an electronic process execution service, that the electronic process execution service execute the agentless remote IT management action; and
in response to the request, execute the agentless remote IT management action, by generating, remote to the one or more electronic assets, an operating system process that includes the agentless remote IT management action in the form of a command that may be implemented by an operating system of the one or more electronic assets, independent of a non-operating system software agent installed at the one or more electronic assets, wherein the command comprises a console command, a shell command, a shell script, a batch script, or any combination thereof.

17. The one or more tangible, non-transitory, computer-readable mediums of claim 16, comprising computer-readable instructions that, when executed by the one or more processors of the one or more computers, cause the one or more computers to:
   identify a requestor of the request;
   determine whether the requestor has access privileges to cause execution of the agentless remote IT management action based upon whether the requestor is in a security group that is associated with the agentless remote IT management action; and
   execute, via the electronic process execution service, the agentless remote IT management action when the requestor has the access privileges, while refraining from executing the agentless remote IT management action when the requestor does not have the access privileges.

18. The one or more tangible, non-transitory, computer-readable mediums of claim 16, comprising computer-readable instructions that, when executed by the one or more processors of the one or more computers, cause the one or more computers to:
   after the execution of the agentless remote IT management action, score an effectiveness of the agentless remote IT management action by comparing a portion of subsequent electronic data related to a particular asset of the one or more electronic assets that the agentless remote IT management action was intended affect with a portion of the electronic data related to the particular asset of the one or more electronic assets to identify a trend direction in the comparison;
   score side effects of the agentless remote IT management action by comparing a portion of the subsequent electronic data related to the one or more electronic assets other than the particular asset with a portion the electronic data related to the one or more electronic assets other than the particular asset to identify a trend direction in the comparison; and
   alter a machine learning model used to identify the agentless remote IT management action based upon the scoring of the effectiveness and scoring of the side effects.

* * * * *